John Demarest, Leader Pipe Coupling.

No. 119,127.   Patented Sep. 19, 1871.

Witnesses:
M. Vorlander
Wm. H. C. Smith.

Inventor:
John Demarest.
Per ——— Attorneys.

UNITED STATES PATENT OFFICE.

JOHN DEMAREST, OF MOTT HAVEN, NEW YORK, ASSIGNOR TO HIMSELF AND JORDAN L. MOTT, OF SAME PLACE.

IMPROVEMENT IN LEADER-PIPE COUPLINGS.

Specification forming part of Letters Patent No. 119,127, dated September 19, 1871.

*To all whom it may concern:*

Be it known that I, JOHN DEMAREST, of Mott Haven, in the county of Westchester and State of New York, have invented a new and Improved Coupling for Cast-Iron Leaders; and I do hereby declare that the following is a full, clear, and exact description thereof, which will enable others skilled in the art to make and use the same, reference being had to the accompanying drawing forming part of this specification.

This invention relates to a new and improved arrangement of couplings or brackets for holding cast-iron leader-pipes upon houses; and it consists in a cast-metal coupling having a suitable hole through it vertically for the pipe, and made in two parts, one of which, being attached to the building, has the other attached to it so that it may be readily taken off at any time for repairing the pipe or putting in a new section, and admit of doing the same without disturbing the other sections or taking them down, as has to be done with the present mode of fastening the leader-pipe.

Figure 1:
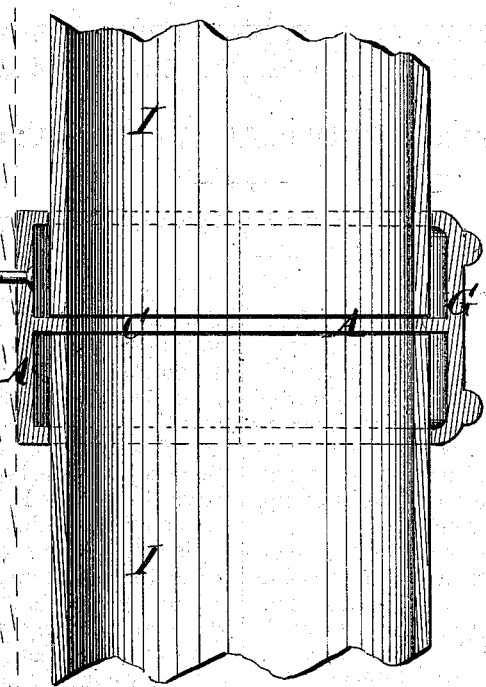
Figure 2:
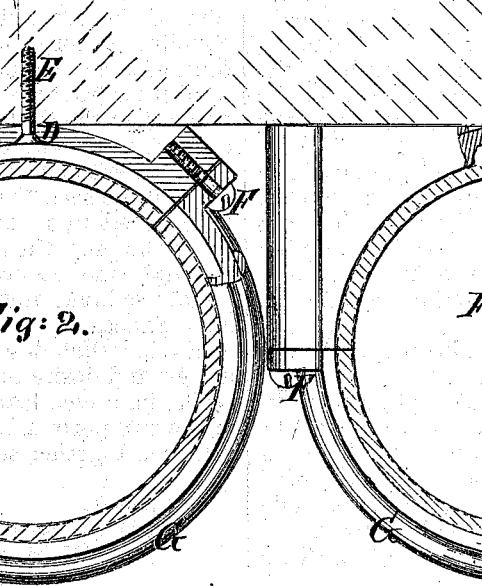
Figure 3:
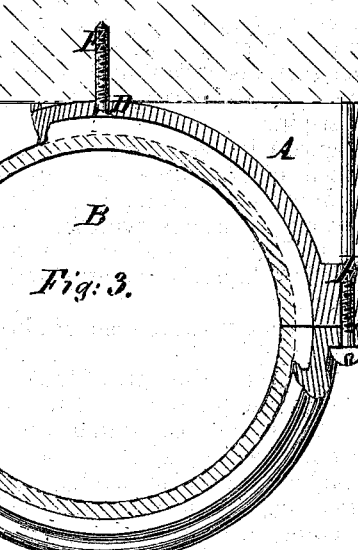

Figure 1 is a vertical sectional elevation of two sections of pipe and the improved device for fastening them. Fig. 2 is partly a top view and partly a horizontal section of the coupling adapted to fit in a corner; and Fig. 3 is a similar view of the same adapted to be attached to the side of a building.

Similar letters of reference indicate corresponding parts.

A represents the part of the coupling to be attached to the building; it has a base suited to fit the plain side of the building or the angle between two walls joining at an angle, as the case may be, and a semicircular cavity, B, in the front side a little larger than the pipe to be held by it. At the center, vertically, it has a flange, C, projecting from the concave face to receive the ends of the pipes against it, as represented in Fig. 2. In the bottom of the cavity is a screw-hole, D, through which a strong screw, E, is to be inserted into a wooden block laid in the wall for holding the coupling in place, and at each end, which is extended sufficiently beyond the concavity for the purpose, a screw-tapped hole is provided to receive the screws F, by which the front part C of the coupling, which is made separately from part A, is attached after the pipes have been put in place, the said front part having a concavity corresponding to that of the part A; also a flange, H, corresponding to C. I represents the sections of the leader-pipe.

In consequence of attaching the coupling to the building by a screw passing through the bottom of the concavity the exterior form of the coupling is more simple and neat than it would otherwise be, for there would have to be flanges projecting from the sides for the screws for fastening it to the wall. The space between the pipe and the inner wall of the coupling is to be filled with cement of any suitable kind.

It will be seen that, besides having the advantage stated in regard to putting up and taking down the pipe, the arrangement of the coupling is simple and economical as to the quantity of metal used and presents a neat and symmetrical appearance.

Having thus described my invention, I claim as new and desire to secure by Letters Patent—

The improved leader-pipe coupling, consisting of the two parts A B, constructed, arranged, and attached together substantially as specified.

JOHN DEMAREST.

Witnesses:
T. B. MOSHER,
GEO. W. MABEE.